US012308401B2

(12) United States Patent
Chatzis et al.

(10) Patent No.: US 12,308,401 B2
(45) Date of Patent: May 20, 2025

(54) POWER SUPPLY MODULE FOR NANOSATELLITE SYSTEMS

(71) Applicant: "ENDUROSAT" Joint Stock Company, Sofia (BG)

(72) Inventors: Antonios Nikolai Chatzis, Sofia (BG); Nikolay Atanasov Kolev, Sofia (BG)

( * ) Notice: Subject to any disclaimer, the term of this patent is extended or adjusted under 35 U.S.C. 154(b) by 560 days.

(21) Appl. No.: 17/787,578

(22) PCT Filed: Nov. 3, 2020

(86) PCT No.: PCT/BG2020/000038
§ 371 (c)(1),
(2) Date: Jun. 20, 2022

(87) PCT Pub. No.: WO2021/119768
PCT Pub. Date: Jun. 24, 2021

(65) Prior Publication Data
US 2022/0416313 A1    Dec. 29, 2022

(30) Foreign Application Priority Data

Dec. 20, 2019    (BG) ........................................ 113049

(51) Int. Cl.
*H01M 10/42*    (2006.01)
*B64G 1/42*    (2006.01)
(Continued)

(52) U.S. Cl.
CPC .......... *H01M 10/425* (2013.01); *B64G 1/428* (2013.01); *H01M 10/465* (2013.01); *H02J 7/0014* (2013.01); *H02J 7/35* (2013.01); *H01M 2010/4271* (2013.01); *H01M 2220/20* (2013.01); *H02J 2207/20* (2020.01)

(58) Field of Classification Search
CPC .... H01M 10/42; H01M 10/425; H01M 10/46; H01M 10/465; H01M 2010/4271; H01M 2220/20; B64G 1/42; B64G 1/428; H02J 7/00; H02J 7/0014; H02J 7/35; H02J 2207/20
See application file for complete search history.

(56) References Cited

U.S. PATENT DOCUMENTS

2011/0031925 A1*    2/2011    Simburger ............. B64G 1/443
                                                              320/101

* cited by examiner

*Primary Examiner* — Robert L Deberadinis
(74) *Attorney, Agent, or Firm* — Inventa Capital Group PLC

(57) ABSTRACT

This invention relates to a power supply module for nanosatellite systems which will find application in the field of space technology and satellite communications, and in particular for powering nanosatellites. The created power supply module consists of at least one battery pack and at least one control and energy distribution module and provides maximum efficiency at a given illumination by adjusting the operating output voltage of the input stages (1.1, 1.2 and 1.3) according to the illumination of the panels. All nodes in the module are duplicated, which achieves complete redundancy of the module, which is activated after the main node is defective, or when the load is greater than the load which this main node can withstand. The use of power busbars, on the other hand, leads to a reduced voltage drop on the respective line, as well as to lower temperature losses. The input channels for the solar panels are transferred to the battery pack and it is possible to connect them in parallel when there are more than one.

1 Claim, 1 Drawing Sheet

(51) Int. Cl.
*H01M 10/46* (2006.01)
*H02J 7/00* (2006.01)
*H02J 7/35* (2006.01)

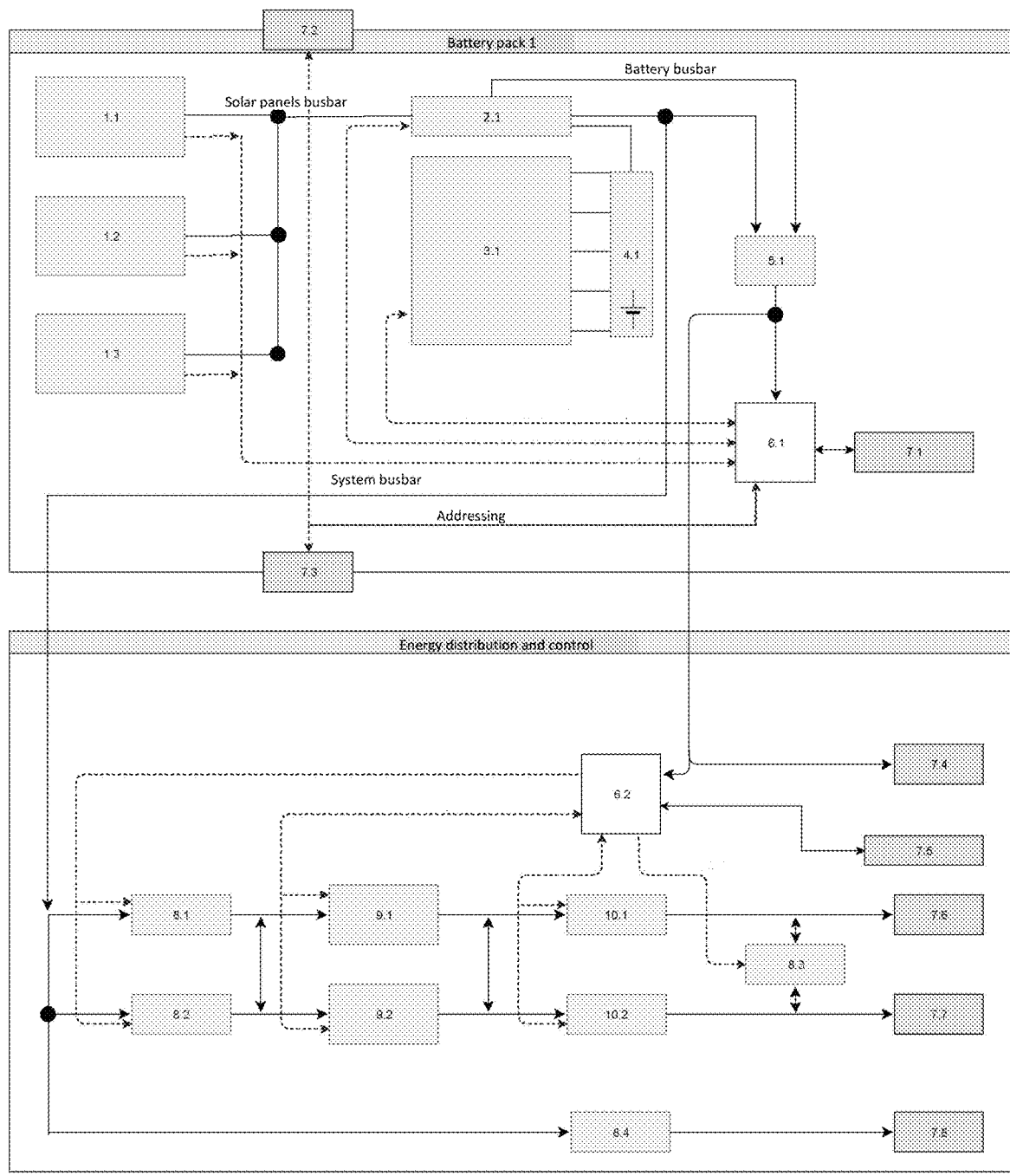

POWER SUPPLY MODULE FOR NANOSATELLITE SYSTEMS

FIELD OF THE INVENTION

This invention relates to a power supply module for nanosatellite systems, which will find application in the field of space technology and satellite communications, and in particular for powering nanosatellites.

BACKGROUND OF THE INVENTION

Nanosatellites are considered to be spacecraft with mass no more than 10 kilograms. Among the most popular nanosatellites are the CubeSats class, which have become popular over the last decade due to their extremely affordable price of several hundred thousand dollars, including their manufacturing and launch into orbit. The concept of this type of spacecraft is based on the idea that humanity can learn much more about space if it uses networks of miniature satellites instead of our traditional large orbiters. The devices that were once housed in huge 10-ton satellites now fit into these small spacecraft, making it possible to generate a wide range of data with unprecedented volumes and revisit times. Nanosatellites are increasingly used for earth observation, for communication purposes, for information transfer, for research and training.

Currently, nanosatellites are used primarily by universities, but not a small number of private companies are launching such machines into orbit to collect data, images and more.

Space research and related infrastructure will become increasingly important in today's world. The space sector is evolving at an extraordinary rate and this will lead to large-scale changes in many industries over the next ten years. More than 7,000 new nanosatellites are expected to be launched worldwide in the next ten years.

Large satellites have heavy lithium-ion batteries and large solar panels to provide the necessary energy. While nanosatellites do not have the same power capacity, their significantly smaller volume allows them to execute specific tasks in a much more efficient way. Their small size also does not allow the installation of large and powerful antennas.

SUMMARY OF THE INVENTION

The invention object is to provide a power supply module for nanosatellite systems which is autonomous, highly efficient and provides secure and uninterrupted power supply to nanosatellites.

The solution is achieved through a power supply module for nanosatellite systems, which consists of at least one battery pack and at least one module for control and energy distribution. Each battery pack includes a charging stage connected on one side, via a solar panels busbar with an input stage on X, with an input stage on Y and with an input stage on Z. On the other hand, the charging stage is connected via a system busbar to battery cells and an auxiliary power supply which is connected in turn to the first control unit. On the third side, the charging stage is connected via a battery busbar to the auxiliary power supply. The battery cell unit is connected to a balancing stage. The first control unit, on the one hand, is connected bidirectionally to the charging stage, to the balancing stage, to the first connector unit and to the first and second addressing connectors. On the other hand, the first control unit is connected unidirectionally to the input stage on X, to the input stage on Y and to the input stage on Z.

Each control and energy distribution module includes, on the one hand, first positive potential line switch connected through first voltage converter with first current limiter connected in turn to first connector for single output power channel. On the other hand, each control and energy distribution module includes a second positive potential line switch connected through second voltage converter with second current limiter connected in turn to second connector for single output power channel. The first positive potential line switch is connected in parallel with the second positive potential line switch. The first voltage converter is connected in parallel with the second voltage converter. The first current limiter through third positive potential line switch is connected in parallel with the second current limiter. Each control and energy distribution module also includes a second control unit which is unidirectionally connected to the first, second and third positive potential line switches and is bidirectionally connected to the first and second voltage converters, to the first and second current limiters according to current and with second connector unit.

The charging stage of the battery pack is connected via the system busbar to the first, second and fourth positive potential line switches. The fourth positive potential line switch has an external connector. The auxiliary power supply is connected to both the second control unit and an auxiliary power supply connector from the control and energy distribution module.

An advantage of the power supply module for nanosatellite systems is that it provides maximum efficiency in a given illumination, by adjusting the operating output voltage of the input stage to the illumination of the panels. In addition, all nodes in the module are duplicated, which achieves complete redundancy of the module. The redundancy is activated after a main node is defective, or when the load is greater than the load which this main node can withstand. The use of power busbars, on the other hand, leads to a reduced voltage drop on the respective line, as well as to smaller temperature losses. The input channels for the solar panels are transferred to the battery pack and it is possible to connect them in parallel when there is more than one.

BRIEF DESCRIPTION OF THE DRAWINGS

This invention is illustrated in the attached FIG. 1, which is a schematic diagram of the power supply module for nanosatellite systems according to the invention.

EXAMPLES OF THE INVENTION EMBODIMENT

The created power supply module for nanosatellite systems, shown in FIG. 1, consists of at least one battery pack and at least one control and energy distribution module. Each battery pack includes charging stage 2.1, connected on one side by solar panels busbar with the X input stage 1.1, with the Y input stage 1.2 and with the Z input stage 1.3. On the other hand, the charging stage 2.1 is connected via a system busbar to a battery cell unit 4.1 and to an auxiliary power supply 5.1, which in turn is connected to first control unit 6.1. Thirdly, the charging stage 2.1 is connected via a battery busbar to the auxiliary power supply 5.1. The battery cell unit 4.1 is connected to a balancing stage 3.1. The first control unit 6.1, on the one hand, is connected bidirectionally to the charging stage 2.1, to the balancing stage 3.1, to the connector unit 7.1 and to the first and second addressing connectors 7.2 and 7.3. On the other hand, the first control unit 6.1 is connected unidirectionally to the X input stage 1.1, to the Y input stage 1.2 and to the Z input stage 1.3.

Each control and energy distribution module includes, on the one hand, first positive potential line switch 8.1 connected via first voltage converter 9.1 with first current limiter 10.1 connected in turn to first connector for a single output power supply channel 7.6. On the other hand, each control and energy distribution module includes second positive potential line switch 8.2 connected via second voltage converter 9.2 to second current limiter 10.2 connected in turn to second connector for single output power supply channel 7.7.

The first positive potential line switch 8.1 is connected in parallel with the second positive potential line switch 8.2. The first voltage converter 9.1 is connected in parallel with the second voltage converter 9.2. The first current limiter 10.1 is connected in parallel to the second current limiter 10.2 via third positive potential line switch 8.3. Each control and energy distribution module also includes second control unit 6.2, which is unidirectionally connected to the first, second and third positive potential line switches 8.1, 8.2 and 8.3, and is bidirectionally connected to the first and second voltage converters 9.1 and 9.2, with the first and second current limiters 10.1 and 10.2. and with second connector unit 7.5.

The charging stage 2.1 of the battery pack is connected via a system busbar to the first, second and fourth positive potential line switches 8.1, 8.2 and 8.4. The fourth positive potential line switch 8.4 is connected to connector 7.8. Auxiliary power supply 5.1 is connected to both the second control unit 6.2 and the auxiliary power supply connector 7.4 of the control and energy distribution module.

The solar panels busbar, the system busbar and the battery busbar used in the power supply module, are power busbars designed to provide current to electrical loads requiring high power. In addition, the power busbars provide much lower resistance as well as lower temperature losses, thus transmitting up to 1 kW of energy from the solar panel inputs to the batteries and electrical loads via the power supply module.

The X input stage 1.1, the Y input stage 1.2 and the Z input stage 1.3 include a connector for solar panels and a pulse voltage converter, which is completely redundant, i.e. when one converter fails, the other takes over its functions. The input stages establish a connection between the created power supply module and the solar panels.

They convert the voltage levels from the solar panels to the appropriate level for the selected configuration of the battery pack. The operating output voltage of each input stage, which takes energy from the solar panels, is adjusted to the illumination of the panels so that the efficiency is maximum at a given illumination.

The functions of the charging stage 2.1 are to provide the required level of charging voltage, to provide and control the charging current supplied to the batteries and to monitor and/or change the charging mode depending on how much the battery is charged. Charging stage 2.1 is a type of charger that supports several types of battery cells, namely Li—PO, Li—FePO, Li-Ion and Lead-Acid (lead-acid batteries). These batteries can be inside the battery pack itself (the first 3 types of batteries) or outside the battery pack, in the case of lead-acid batteries. This charger is also completely duplicated, so that when one charger fails, the other takes over its functions.

The balancing stage 3.1 includes temperature sensors and a circuit for balancing the charge between the individual cells of the battery pack. The functions of the balancing stage 3.1 are to ensure equal charge in each cell of the battery pack both during charging and discharging of the batteries, to provide protection of the batteries from external short circuit, in case of damage of any cell in the battery pack to disconnect it from the power busbar of the device and to monitor the temperature of the battery pack and, if necessary, disconnect it from the power busbar of the module as a temperature protection.

The battery cell unit 4.1 includes four, six or eight battery cells that are connected in series with each other. The battery cell unit 4.1 includes a heater that envelops each cell for even heating, temperature sensors (two for each cell) and the battery cells themselves. The functions of the battery cell unit 4.1 are to maintain the temperature of the battery cells in the required temperature range, ensuring their optimal mode of operation and long life and to provide information on the temperature of each cell to the first control unit 6.1.

The auxiliary power supply 5.1 contains a pulse voltage converter with two inputs. The functions of the auxiliary power supply 5.1 are to provide energy to the control units in the module, as long as there is energy in the batteries or the solar panels convert energy and to maintain the required voltage level.

The first control unit 6.1 includes a microcontroller, a radiation sensor and ferromagnetic RAM. The first control unit 6.1 collects information from all sensors; provides collected information in raw and/or processed form to the computer located in the satellite via the two RS-485 communication channels; executes algorithms for releasing an antenna or solar panel based on a request from the computer located in the satellite; transmits data on the overall status of the module to a graphical interface located on a remote personal computer via a connection by USB connector and sets the programming parameters of the module with the values requested by the user via the graphical interface.

Connector unit 7.1 includes a connector for releasing an antenna or solar panel, a connector for communication with a computer through USB and two connectors for communication with the other control devices in the satellite RS-485 main and RS-485 backup. The connector unit 7.1 provides a physical connection between the module and an antenna or solar panel, provides a physical connection between the created power supply module and another module of the satellite, and provides a physical connection between the created power supply module and the user's computer.

The first and second addressing connectors 7.2 and 7.3 assign a unique address to each battery packet that connects to the power supply module, with the goal of having absolutely identical battery packs receive different addresses depending on their location in the arranged packet pole.

The auxiliary power connector 7.4 provides the physical connection between each module in the satellite and the auxiliary power 5.1, the purpose is for connector 7.4 to act as a small backup battery and thus eliminate the need to install one in each module.

The second connector block 7.5 includes two connectors for communication with the other control devices in the satellite: RS-485 main and RS-485 backup and two connectors for communication with the payload of the satellite also RS-485 main for payload and RS-485 backup for payload. The first and second connectors for one channel of the output power supply 7.6 and 7.7 provide a physical connection between the output voltage from the module to any other module in the satellite.

Connector 7.8 provides a physical connection between the output voltage (battery busbar) from the module to the payload of the satellite (Payload). The first and second positive potential line switches 8.1 and 8.2 connect or disconnect the first and second voltage converters 9.1 and 9.2 of the common system busbar, respectively. The second positive potential line switch 8.2 duplicates the first positive potential line switch 8.1.

The third positive potential line switch 8.3 allows the user to choose between the two options of using the available channels with the pulse voltage converters 9.1 and 9.2 by connecting or interrupting the outputs of the two independent output channels. The options are: the duplicate channel to act as a backup of the main channel, which leads to higher security, but fewer independent channels, or both channels (main and duplicate) to be independent channels, which leads to lower security, but a larger number of independent channels.

The fourth positive potential line switch 8.4 connects or disconnects connector 7.8 from the common system busbar. The first and second voltage converters 9.1 and 9.2 are pulse voltage converters that convert the voltage level in the system busbar to a lower level in the range between 1 V and 12 V. The second voltage converter 9.2 can duplicate the first voltage converter 9.1, depending on the state in which switch 8.3 was set.

The first and second current limiters 10.1 and 10.2 include a current limiting circuit with a programmable actuation level so that no current greater than the preset current is allowed to pass. Current limiters 10.1 and 10.2 serve as overload protection of the power supply module itself, as well as to protect the load connected to an output. Depending on the state of the switch 8.3, the second limiter 10.2 may duplicate the function of the first limiter 10.1 or both outputs may be independent.

The created power supply module for nanosatellite systems is used as follows:

The solar panels located on the satellite are connected to the connectors in the input stages 1.1 and/or 1.2 and/or 1.3. The energy generated by these panels through the voltage converter in input stages 1.1 and/or 1.2 and/or 1.3 is converted into voltage with a potential optimal for the most efficient charging of the battery pack connected to this power supply module. This energy is supplied to the input of the charging stage 2.1. From there, the main part of this energy is directed to the battery cells 4.1 and with the help of balancing stage 3.1 is stored into them. A smaller part of this energy is fed to one input of the auxiliary power supply 5.1, which serves as an uninterruptible power supply to the control units 6.1 and 6.2 of the power supply module.

When the cells are charged, then most of the energy of 2.1 is fed to the control and energy distribution module, this is done by means of positive potential line switches 8.1 or 8.2 to the respective voltage converter 9.1 or 9.2. There may be more than one such voltage converter in the module, most often ten. Each voltage converter serves to convert the input voltage to the output voltage at a different level, according to the requirements of the payload and the subsystems used in a given satellite.

This output voltage is supplied to connector 7.6 or 7.7 to be accessible by any module that uses a power supply with such a potential. Respective current limiter 10.1 or 10.2 is connected between the first voltage converter 9.1 or the second converter 9.2 and the connectors 7.6 or 7.7, respectively, to limit the current that can be consumed by an external device connected to this output. The level of protection activation can be set by the customer directly from an external computer via USB.

Depending on the need, between one and eight battery packs can be connected in the power supply module. Through addressing connectors 7.2 and 7.3, the power supply module can recognize how many identical battery packs are connected and how many of them are active at a time. This information is important because, knowing what energy capacity the system has, it is possible to manage energy more efficiently and distribute it among consumers.

In addition, it is also possible to use more than one control and energy distribution module. These modules are identical and, like the battery packs, can be between one and eight. This functionality provides the possibility for more output channels, for a larger number of independent consumers.

The state of the power supply module can be determined either via a USB connection to a computer or via the RS-485 communication interface of the communication connectors 7.5 from a computer module located on the satellite. This information is used to monitor and diagnose the power supply module.

Also the created power supply module has the possibility to choose between the two modes of distribution of the energy received from the solar panels. The first mode is "Battery Cell Priority", where charging the batteries has a higher priority than the consumers connected to the outputs of the power supply module. This means that when the energy is less than needed and not enough for the batteries and consumers, it will be redirected to the battery cells and only the excess will be directed to the consumers. In the second "Consumer Priority" mode, consumers have priority. Then the energy will be redirected to the consumers directly and if there is an excess of energy, then it will be used to charge the battery cells.

The invention claimed is:

1. Power supply module for nanosatellite systems, characterized in that it consists of at least one battery pack and at least one control and energy distribution module, wherein each battery pack includes charging stage (2.1) connected on one side via solar panels busbar with X input stage (1.1), with Y input stage (1.2) and with Z input stage (1.3), on the other hand, the charging stage (2.1) is connected via a system busbar to battery cells (4.1) and with auxiliary power supply (5.1) connected on its own side to the first control unit (6.1), and on the third side the charging stage (2.1) is connected via a battery busbar to the auxiliary power supply (5.1), and the battery cell unit (4.1) is connected to balancing stage (3.1), in which the first control unit (6.1) on the one hand is connected bidirectionally to the charging stage (2.1), to the balancing stage (3.1), to the first connector unit (7.1) and to first and second addressing connectors (7.2) and (7.3), on the other hand, the control unit (6.1) is connected unidirectionally to the input stage on X (1.1), to the input stage on Y (1.2) and to the input stage on Z (1.3), where each control and energy distribution module includes on the one hand, first positive potential line switch (8.1) connected via first voltage converter (9.1) to first current limiter (10.1) connected in turn to first connector for single output power channel (7.6), on the other hand, each control and energy distribution module includes second positive potential line switch (8.2) connected via second voltage converter (9.2) to second current limiter (10.2) connected in turn to second connector for single output channel power supply (7.7), the first positive potential line switch (8.1) being connected in parallel with the second positive potential line switch (8.2), the first voltage converter (9.1) being connected in parallel with the second voltage converter (9.2), and the first current limiter (10.1) is connected in parallel to second positive potential line switch (8.3) in parallel with the second current limiter (10.2), each control and energy distribution module including second control unit (6.2), which is unidirectionally connected to the first, second and third positive potential line switches (8.1), (8.2) and (8.3), and is bidirectionally connected to the first and second voltage converters (9.1) and (9.2), to the first and second current limiters (10.1) and (10.2), and with second connector unit (7.5), where the charging stage (2.1) is connected via a system busbar to the first, second and fourth positive potential line switches (8.1), (8.2) and (8.4), the fourth positive potential line switch (8.4) being connected to connector (7.8), where the auxiliary power supply (5.1) is connected to both the second control unit (6.2) and the connector for auxiliary power supply (7.4) from the control and energy distribution module.

* * * * *